United States Patent [19]

Ito et al.

[11] 4,380,284
[45] Apr. 19, 1983

[54] CHIP CONVEYER

[75] Inventors: Takeshi Ito, Tama; Shuzo Ishizuka; Keiichi Goto, both of Sagamihara; Keiki Saito, Yokohama, all of Japan

[73] Assignee: Caterpillar Mitsubishi Ltd., Japan

[21] Appl. No.: 189,297

[22] Filed: Sep. 22, 1980

[30] Foreign Application Priority Data

Sep. 28, 1979 [JP] Japan .................. 54-135582[U]

[51] Int. Cl.³ ........................................... B65G 45/00
[52] U.S. Cl. ................................. 198/494; 198/540
[58] Field of Search ............... 198/494, 631, 500, 537, 198/546, 547, 540

[56] References Cited

U.S. PATENT DOCUMENTS

| 1,331,484 | 2/1920 | Carr | 198/494 |
|---|---|---|---|
| 2,286,078 | 6/1942 | Gallai-Hatchard | 198/537 |
| 2,303,957 | 12/1942 | Sayre | 198/546 |
| 2,506,372 | 5/1950 | MacDonald | 198/494 |
| 2,724,493 | 11/1955 | Jones | 198/494 |
| 2,743,004 | 4/1956 | Wright | 198/631 |

FOREIGN PATENT DOCUMENTS 529918 7/1954 Belgium ................. 198/546

*Primary Examiner*—Joseph E. Valenza
*Attorney, Agent, or Firm*—Robert E. Burns; Emmanuel J. Lobato; Bruce L. Adams

[57] ABSTRACT

A chip conveyer which comprises a cylindrical trough having a discharge gate at one end thereof and a plurality of feed openings to receive metal chip and a plurality of endless chains laid within the trough thereby metal chip is transmitted from feed openings to the discharge gate and clinging chip to the endless chains is split by vibration generated by means of a cam means.

9 Claims, 10 Drawing Figures

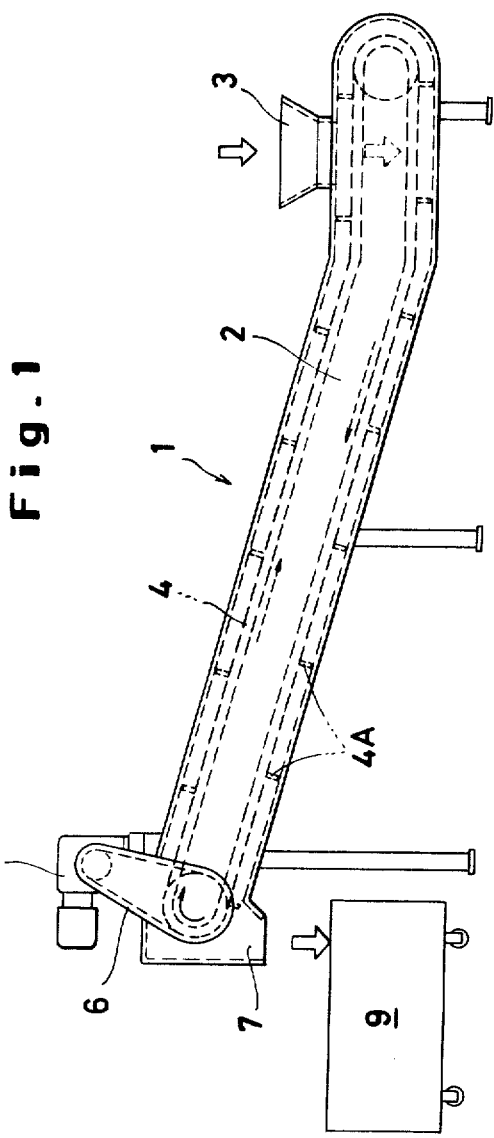

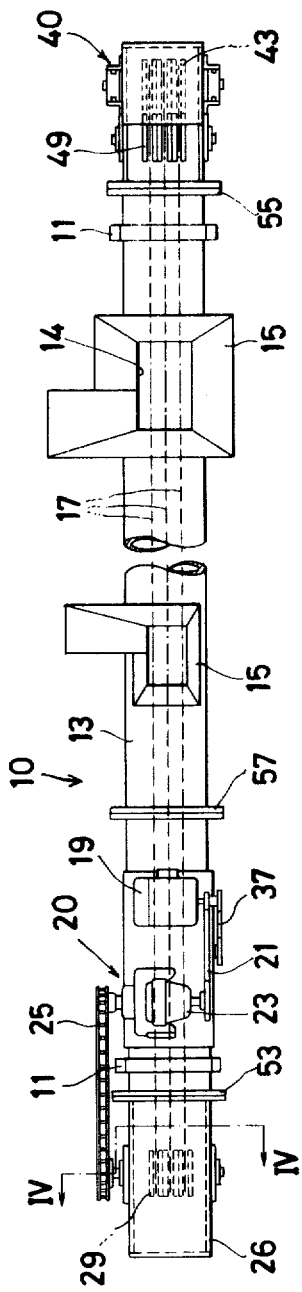

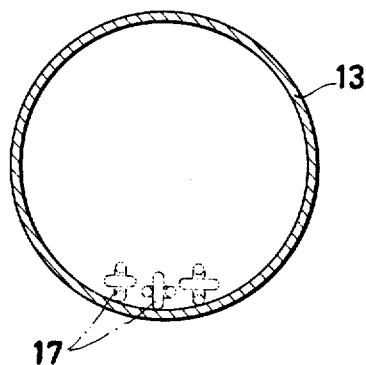
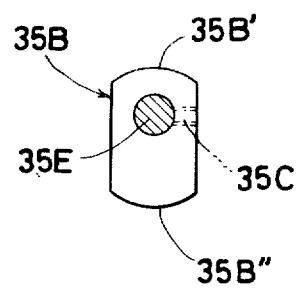
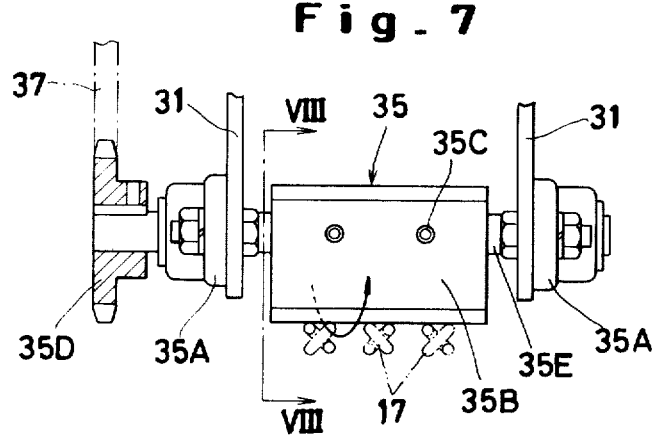
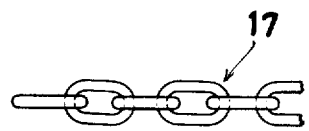
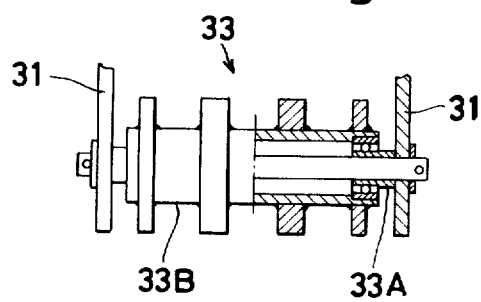

CHIP CONVEYER

BACKGROUND OF THE INVENTION

The invention relates to conveyer system and more particularly to a chip conveyer for transmitting continuous and/or discontinuous metal chip produced by machine tools.

In the conventional shop practice, a scraper type or hinge plate type conveyer has been employed to transfer metal chips. The scraper type conveyer comprises an open-link chain associating with equally spaced upright plates. The endless belt powered by a proper traction wheel receives metal chips while the endless belt passes beneath a hopper and carries off scraped chips to a dump.

The scraper type belt conveyer has an endless track chain in which a series of unit square plates are hinged together. The conveyer of this type is also powered by a traction wheel, receives chips while travelling under the feed point and conveys the load to a dump in a fashion similar to the scraper type system.

Although the above prior apparatus has been useful and satisfied the chip handling requirements, they are basically designed in a sizable unit components and it is necessary to scale down each dimension for less load requirements.

Attempts have been made to substitute a favorably dimensioned apparatus for a system having excessive capacity, however, the shop used to provide unwanted standard system because such attempts did not prove to curb investment cost.

SUMMARY OF THE INVENTION

The present invention is directed to overcoming one or more problems as set forth above.

It is an object of this invention to provide a novel chip conveyer system in which unrequired space and cost in the existing systems are eliminated.

It is a further object of this invention to provide a durable and economical chip conveyer which replaces the customary trough with a cylindrical tube incorporating chain linkage for driving chips encased therein.

According to the present invention, the new conveyer system comprises a properly supported, lengthy enclosed trough having multiple feed openings to receive chips at proper locations between terminal wheels, a plurality of chains running within the trough in the loaded run, a driving and tensioning mechanisms disposed at both ends of the trough and cam means actuated by the driving motor.

In the loaded run, mass of metal chip squeezed into the closed trough is caught together and is moved by the pull of the chain with the friction-drag behavior.

In the return run, the chain released from the load is in for vibration generated by the cam means where the fine chip residue clinging to the chain is completely shaken off.

BRIEF DESCRIPTION OF THE DRAWINGS

The exact nature of this invention, as well as other objects and advantages thereof, will be readily apparent from consideration of the following specification relating to the annexed drawings in which, FIG. 1 shows a general view of the existing scraper type chip conveyer, FIG. 2 is a plan view of an embodiment of the invention, FIG. 3 illustrates a side view of the invention, FIG. 6 shows a sectional view looking along the line VI—VI of FIG. 3, FIG. 7 illustrates an enlarged section in part viewing in the direction of the arrow VII of FIG. 3, FIG. 8 shows a section at lines VIII—VIII of FIG. 7, FIG. 9 illustrates the chain in part and, FIG. 10 illustrates an enlarged section in part viewing in the direction of the arrow X of FIG. 3.

DETAILED DESCRIPTION OF THE PREFERRED EMBODIMENT

Figure 4:
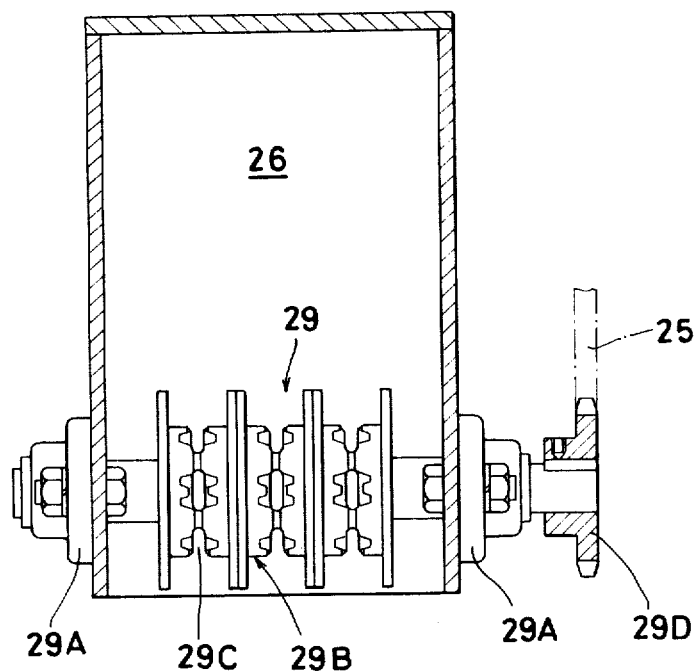
FIG. 4 shows a section taken along the line IV—IV of FIG. 2.

Referring to FIG. 1, symbol 1 indicates a typical chip conveyer. The conveyer comprises a closed trough in square section, drive and idle pulleys on distal ends thereof, a pair of endless chains tracing over the pulleys in a spaced apart relation and a plurality of blades 4A secured to the chain at given intervals, the free end of each blade being engaged with the bottom of the trough. The endless chain is powered by a driving motor 5 through means of the belt 6 and driven in the arrow direction.

In this arrangement, metal chips produced in machining (not shown) are received at hopper 3 and fall onto the bottom of the trough through the chain. Metal chips held in between the blades are transmitted to the exit 7 and dumped to the waste container 9.

The conventional chip conveyer exemplified above has an inherent drawback of poor shop economy in treating less than maximum load requirements and in reducing original investment, resulting from the fact that the original cost does not become reduced in proportion to the capacity of the system having the same configuration in trough and moving components.

The present invention offers a displacing technology to eliminate the above disadvantages.

Figure 5:
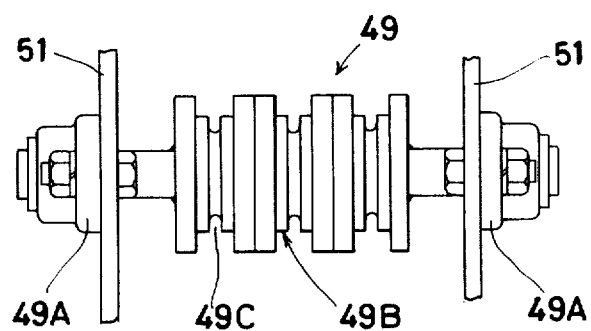
FIG. 5 shows an enlarged section viewing in the direction of the arrow V of FIG. 3.

The chip conveyer in the present invention designated by symbol 10 is shown in detail from FIG. 2 to FIG. 10. The trough 13 in this invention is a long cylindrical tube and can make use of a commodity available in the market, for instance, steel tube may be procured for a trough geared to the amount of chips that should be treated. A plurality of openings 14 are provided at proper locations above the trough 13 and hoppers 15 are secured thereon. Driving means 20 and tensioning means 40 are disposed on either end of the trough 13. A plurality of endless chains 17 are operably laid parallel within the trough 13. The chain link structure is in an oval shape as shown in FIG. 9. Shape and dimensions may be optional according to the diameter of the trough and amount of chips that should be treated. Diameters of 15-25 mm and 20-40 mm are preferred in this invention.

Symbol 57 indicates the connection flange for the trough 13. A plurality of the bases 11 supporting the trough 13 are gradually reduced in their heights to give a slant to the trough 13 toward the downhill end for ease of recovery of cutting oil caught by the chips. Driving means 20 disposed at the end of the trough 13 comprises a driving motor 19, reduction gear 23 and driving roller 29 to transmit power from the driving motor 19 to the chain linkage 17 through means of belts 21 and 25. The driving roller 29, as detailed in FIG. 4, comprises sets of roller bodies 29B journaled in tandem to the housing 26 by means of the bearings 29A. Each roller 29B provides a set of gear teeth profiled to secure a strong traction bite on the chain links. Symbol 29D is a gear wheel to transmit power from the reduction gear 23 to the roller 29B. Five meters per minute is a preferred traveling speed of the chain. As shown in FIG. 3, the housing 26 is attached to the trough 13 by means of a flange connection 53. The bottom of the housing is opened for an exit for chips to dump them into the waste container or any other conventional facility.

Tensioning means 40 comprises a first tensioning roller 43 and a plurality of idle wheels 49 encased by a housing 51 attached to the end of the trough by means of a flange connection 55.

The first tension roller 43 journaled to the housing 51 adjusts the tension of the endless chain 17 by tightening or loosening a bolt 45 and a nut 47. An oil sump 60 for waste oil and a drainage 59 are disposed underneath the housing and drain oil is accumulated in the oil sump 60. The idle wheel 49, as detailed in FIG. 5, comprises a set of roller bodies 49B journaled in tandem to the housing 51 by means of the bearings 49A. Each idle roller has an annular groove to mesh with the endless chain.

Cam means 35 is disposed within a housing 31 attached to the bottom of the trough 13 adjacent to the driving means 20 and powered by the driving motor 19 through means of a belt 37 and a driving wheel 35D. Structural features are detailed in FIGS. 7 and 8. A cam body 35B, rotatably journaled to the housing 31 by means of a bearing 35A, has round peripheries at its top and bottom and eccentrically secured to a shaft 35E by means of a set screw 35C to generate eccentric motion. Second tensioning rollers 33 journaled to the housing 31 by means of a bearing 33A as detailed in FIG. 10 comprise a roller body 33B. The roller body 33B has annular grooves to engage with the endless chains. The grooves do not need to have a profile similar to the roller 49B. They just have to be flat to give a cyclic impact to the endless chains. Six times per second is a preferred cycle of impact.

Carrier rollers 39 and 41 are disposed at proper locations to prevent endless chains from sagging. The roller 41 is preferably of similar configuration to the second tensioning roller 33 to prevent swaying contact between the chains.

In operation of the chip conveyor 10 of this invention, metal chips produced from the production line (not shown) are gathered by a proper means (not shown) and thrown into the hopper. A mass of jumbled chips of irregular forms is moved in the direction of the arrows as shown in FIG. 3 as the endless chain travels and the chips are dumped out of the exit. The endless chain released from the load runs around the terminal wheel and goes down to the cam means, where fine chip clinging to the chain are split off by the oscilating motion of the cam 35 to prevent fine chips from going back to the carrying run. Free links travel rightward beneath the trough 13 through the carrier rollers and return to the former position to repeat the operation.

The idle wheel 49 in the tensioning means 40 aims at giving smooth operation to the endless chains 17. The first tensioning roller 43 is provided for adjustment of the tension in the endless chains. Adjustment is attained by tightening or loosening the fastener 45 and 47.

While the system is in operation, cutting oil caught by the chips drips and flows down toward the drainage due to the slant of the trough.

With the arrangement of the novel chip conveyer system set forth above, massive chips of many variations in size and form produced by machine tools can be handled easily. The present invention represents a pipeline transportation system with a floating drag line encased therein. The system comprises no carrier, no flight and no hinge connection requiring no repair and replacement nuisance. When loaded, metal chip material moves as a continuous, squeezed core within the closed trough by a positive drag of the floating chain and creates self-running action of the chip material in transit, leaving no residue.

Also, the system can easily be built with ubiquitous commodities such as steel tubes and chains without preliminary design problems. This results in a maximum flexibility in layout design and minimum investment and maintenance cost.

Obviously, many modifications and variations of the present invention are possible in the light of the above teachings. It is therefore, to be understood that within the scope of the appended claims, the invention may be practiced otherwise than as specifically described.

What is claimed is:

1. A chip conveyor for receiving metal chip material at a multitude of feed openings and transmitting said chip material to a discharge gate comprising,
   a cylindrical, lengthy trough substantially closed continuously along its length and having a discharge gate at one end and a plurality of hoppers for receiving said chip material disposed between both ends of said trough,
   a plurality of endless chains running within the lower part of said trough in its loaded run and running outside of said trough in its return run,
   means for tensioning said chains disposed at one end of said trough,
   a driving means for driving said chains, and
   a cam means for giving vibration to said chains disposed outside of said trough and powered by said driving means.

2. A chip conveyer as set forth in claim 1 wherein said trough has a downward slope toward the opposite direction of the loaded run.

3. A chip conveyer as set forth in claim 2 wherein said trough further comprises an oil sump for accumulating drained oil at the lower end of the trough.

4. A chip conveyer as set forth in claim 1 wherein said trough is a steel tube.

5. A chip conveyer as set forth in claim 1 wherein said cam means comprises a cam for shaking said chains by eccentric impact to remove fine chip clinging thereto.

6. A chip conveyer as set forth in claim 1 wherein each link of said endless chains is in oval form.

7. A chip conveyor for transporting metal chip material, comprising:
   a cylindrical tube having a discharge gate at one end and a plurality of hoppers along the length thereof for receiving in use metal chip material to be transported through said tube, said cylindrical tube being closed along its length except at said plurality of hoppers, and wherein said cylindrical tube is comprised of a plurality of cylindrical tube sections aligned lengthwise and connecting means for connecting together said aligned plurality of tube sections so that said plurality of tube sections jointly define said cylindrical tube;

a plurality of endless chains each having respective portions extending through said cylindrical tube parallel and along the bottom of said cylindrical tube beneath said hoppers for transporting metal chip material introduced into said cylindrical tube through said hoppers as said endless chains travel lengthwise through said cylindrical tube, said plurality of endless chains each having respective portions extending along the length of said cylindrical tube outside of said cylindrical tube, and said plurality of endless chains being effective to advance metal chip material within said cylindrical tube introduced into said cylindrical tube through said hoppers as said plurality of endless chains are advanced through said cylindrical tube toward said discharge gate and discharge the metal chip material through said discharge gate;

means for tensioning said plurality of endless chains;

driving means for driving said plurality of endless chains to advance within said cylindrical tube toward said discharge gate; and means connected to be driven by said driving means and comprised of a cam disposed outside of said cylindrical tube for vibrating the portions of said endless chains disposed outside of said cylindrical tube.

8. A chip conveyor as set forth in claim 7, wherein said means comprised of a cam further comprises a shaft extending generally transverse to the direction of travel of the portions of said chains outside of said cylindrical housing, and means for rotating said shaft, and wherein said cam is a plate mounted on said shaft for rotation therewith and is dimensioned to strike the portions of said chains outside of said cylindrical housing to impart vibrations thereto.

9. A chip conveyor as set forth in claim 8, wherein said driving means for driving said plurality of endless chains drives said means for rotating said shaft.

* * * * *